United States Patent Office 2,880,208
Patented Mar. 31, 1959

2,880,208

PREPARATION OF UNSATURATED CYCLIC UREA DERIVATIVES

Robert S. Yost, Oreland, Pa., assignor to Rohm & Haas Company, Philadelphia, Pa., a corporation of Delaware No Drawing. Application December 11, 1956
Serial No. 627,572

15 Claims. (Cl. 260—251)

This invention relates to a new and improved process for the production of N-vinyl-2-imidazolidinones and the N-vinyl-tetrahydro-2-pyrimidinones. These compounds are sometimes called vinyl ethyleneureas or vinyl trimethyleneureas. This application is a continuation-in-part of my copending application Serial No. 567,064, filed February 23, 1956, now abandoned.

Compounds prepared in accordance with the new process of the present invention have the structure of Formula I:

I
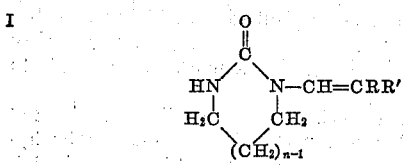

where R is selected from the group consisting of H, phenyl, tolyl, benzyl, cyclohexyl and alkyl groups having 1 to 8 carbon atoms, and R' is selected from the group consisting of H and alkyl groups having 1 to 4 carbon atoms, and $n$ is an integer having a value of 1 to 2.

In accordance with the present method for producing these compounds, an aldehyde of Formula II is reacted with a compound of Formula III:

II       RR'CHCHO

III
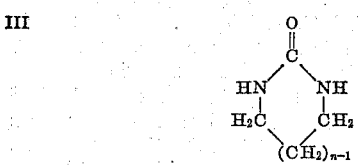

Examples of the aldehydes that may be so reacted are acetaldehyde, propionaldehyde, butyraldehyde, isobutyraldehyde, n-valeraldehyde, 2-methyl-butanal, heptaldehyde, caprylic aldehyde, pellargonic aldehyde, hexahydrophenylacetaldehyde, phenylacetaldehyde, β-phenylpropionaldehyde, p-tolylacetaldehyde, m-tolylacetaldehyde, o-tolylacetaldehyde, and so on. Examples of the compounds of Formula III are ethyleneurea and trimethyleneurea.

Reaction between the aldehyde of Formula II and the cyclic urea of Formula III may be effected merely by mixing the two reactants together in the presence of acid or mixing the reactants and then adding a small amount of acid or mixing the reactants under such conditions that a small amount of acid is developed as by oxidation of a part of the aldehyde effected in a solvent for the reactants. The solvent is preferably water, but instead there may be used such lower alcohols as methanol, ethanol, and isopropanol. When water is used as the solvent, the condensation of compounds II and III is effected on the acid side at a pH of less than 7, such as from a pH between 1 and 5 or between 3.5 and 4.5, and preferably between 6.0 and 6.5. To obtain the pH desired, a small amount of any suitable acid may be added, such as sulfuric, hydrochloric, acetic, oxalic, and so on. While the proportions between the reactants II and III may vary, it is preferable to use between 1 and 2 moles of the aldehyde of Formula II for each mole of the cyclic urea of Formula III. The amount of solvent that may be used may vary widely, but for practical purposes it is preferred that the reaction be carried out in a fairly concentrated solution. It is generally desirable to add one of the reactants or a solution thereof to the other reactant or to a solution of the other. For example, the aldehyde may be added to an aqueous solution of the cyclic urea, the addition being made gradually over a period of time. The temperature may vary from 15° to 220° C., depending upon the boiling point of either of the reactants or the solvent. Preferably, organic acids are employed and frequently the aldehyde may contain sufficient organic acid as an impurity to provide all the acid that is necessary. In many cases, it may be desirable to cool one or both of the reactants or their solutions before mixing them. For example, the aldehyde or its solution may be cooled to 15° or 20° C. or even somewhat lower before it is added to the solution of the cyclic urea which may be at a temperature of 25° to 30° C., at room temperature or even at a temperature therebelow. After the addition of the aldehyde to the cyclic urea, it may be necessary to provide additional cooling to prevent volatilization of either of the reactants or of the solvent, depending upon the concentration and the rate of addition which, of course, influences the extent to which the temperature is raised. The mixing of the reactants, such as by the addition of the aldehyde to a cyclic urea solution may be effected very quickly as in a period of a few minutes or it may take a period of as much as three-quarters of an hour to an hour or more. After the addition has been completed, the mixture is allowed to stand with heating or cooling or without either heating or cooling until 90% to 100% of the aldehyde has reacted with the cyclic urea, which may readily be determined by titrating in accordance with the sulfite method of detecting an aldehyde. After substantial completion of the reaction, the acid may be neutralized, but if only a small quantity of acid is present, such neutralization may not be needed. Neutralization, if employed, may involve adjustment of the pH to 7 to 8; that is, to approximate neutrality with a base, such as a solution of caustic soda, caustic potash or the like.

Thereafter, the water and any unreacted aldehyde or aldol-condensation by-products are removed by distilling in a vacuum. Generally, the distillation may be effected at a temperature of the batch between 50° and 100° C. It is preferable to keep the batch hot while distilling, such as at a temperature of at least 50° C. to avoid the development of excessive viscosity which would render agitation and heat-transfer into the batch rather difficult.

By the reaction between Compounds II and III, a compound of Formula IV is believed to be obtained in accordance with Equation A following:

EQUATION A

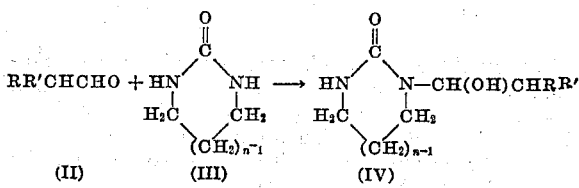

The compound of Formula IV obtained by Equation A is believed to condense with itself to produce a polymer (V) in accordance with Equation B following:

EQUATION B

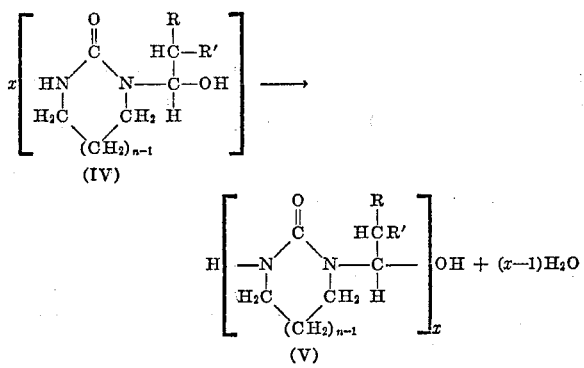

After unreacted aldehyde, water, and by-products have been stripped, the heating in vacuum is continued through temperatures of at least 185° C. up to 285° to 300° C. while gradually increasing the vacuum to distill as much of the product having Formula I as is possible. The product of Formula I appears to be obtained as a result of the cracking of the compound of Formula V, which appears to occur at temperatures of 185° to 285° C.

The distillate contains the product of Formula I and may contain unreacted cyclic urea. The product of Formula I is recovered from the distillate by heating it and agitating it in the presence of a solvent for the product, such as toluene, xylene, ethyl, acetate, acetone, or ether, which extracts the product. Generally, any common organic solvent except alcohols and aliphatic hydrocarbons may be employed as the extracting solvent. This extraction may be effected while refluxing the solvent to prevent its loss. The insoluble cyclic urea is filtered off leaving the product dissolved in solvent as obtained in the filtrate. The solvent is then stripped off by distillation and further purification may be effected either by distillation or recrystallization of the product from another solution in a solvent, such as by chilling it.

When an alcohol is used as the solvent, the reaction between Compounds II and II is effected in a similar manner, the same amount of acid being added as would be needed to produce the desired pH of not over 7 if water were used as the solvent. For this purpose, a methanolic hydrogen chloride may be used. In the case of using an alcohol as the solvent, and especially when acetaldehyde is used, an α-alkoxyalkyl cyclic urea of Formula VI and a bis-(α-alkoxyalkyl) cyclic urea of formula VII may be obtained as by-products, apparently as a result of the process represented by Equations C and D:

EQUATION C

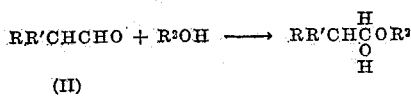

where $R^2$ is the alkyl group of the alcohol.

EQUATION D

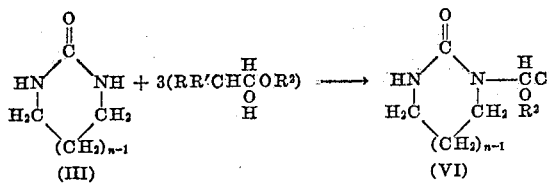 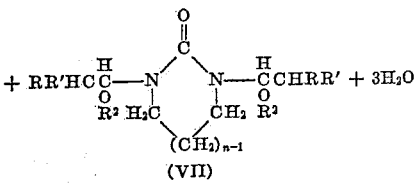

The weight of the α-alkoxyalkyl cyclic urea of Formula VI may amount to 30% of the total reaction product. Generally, a polymer of Formula V constitutes about 40% of the reaction product and about 7% to 10% of the reaction product is a bis-α-alkoxyalkyl cyclic urea of Formula VII above. The alcohol is stripped off along with any residual aldehyde. Then the α-alkoxyalkyl and bis-α-alkoxyalkyl cyclic ureas are distilled off and caught in a separate fraction, which is followed by the distillation of the desired product under high vacuum at temperatures of 185° to 285° or 300° C. where cracking to produce a compound of Formula I occurs. The product of formula I may be isolated from the last fraction distilled in the same manner as described hereinabove.

Additional monovinyl cyclic urea is obtained by adding a small amount, such as 1% to 5%, based on the weight of the alkoxyalkyl cyclic urea, of an alkali metal alkoxide, such as sodium methoxide or sodium ethoxide, to the fraction containing the α-alkoxyalkyl and bis-α-alkoxyalkyl cyclic ureas of Formulas VI and VII. Fractional distillation in the presence of these alkoxides converts the α-alkoxyalkyl cyclic urea of Formula VI to the N-monoalkenyl cyclic urea product, such as the N-vinyl cyclic urea product, which may be collected.

In the following examples, the parts and percentages are by weight unless otherwise indicated. When spot-plate pH is referred to in the alcoholic systems, it is determined by adding a drop of the alcoholic system to a drop of an aqueous solution of an indicator, such as brom-cresol green when the pH is in the range of about 4 to 5 and brom-thymol blue when the pH is about 6 to 7.6.

Example 1

A solution of methyl hemiacetal was prepared by adding 88 parts of freshly-distilled acetaldehyde to 160 parts of anhydrous methanol over a period of thirty minutes while maintaining the temperature at 25° to 30° C.

N,N'-ethyleneurea (172 parts) was dissolved in 200 parts of methanol and 6 parts of 7.3% methanolic hydrogen chloride was added. The methyl hemiacetal (248 parts) was then added over a period of one hour while holding the temperature at 30° to 35° C. The mixture was agitated at 32° to 34° C. for thirty minutes and then allowed to stand at room temperature (28° C.) overnight. Methanolic sodium methoxide (3 parts of 25.4% solution) was added and the methanol and water stripped in vacuo. The residue was distilled thru a modified Claisen apparatus to yield fraction A (92.5 parts) having a boiling range from 91° C. at 1.4 mm. Hg to 163° C. at 2.0 mm. Hg; and fraction B (115 parts) having a boiling range from 163° C. at 2.0 mm. Hg to 168° C. at 2.4 mm. Hg. The latter fraction was formed by "cracking" a fairly viscous, resinous material.

Fraction A was redistilled to yield fraction A-1 (16.5 parts) boiling at 84° to 87° C. at 0.6 mm. Hg. Fraction A-2 (14.6 parts) boiling at 86° to 103° C. at 0.65 mm. Hg; and fraction A-3 (37.5 parts) boiling at 103° to 114° C. at 0.75 mm. On the basis of methoxyl group and nitrogen analyses, the compositions of the three fractions were as follows:

Fraction A-1:
  83% N,N'-bis[α-methoxyethyl]-N,N-ethyleneurea
  17% N-[α-methoxyethyl]-N,N'-ethyleneurea Fraction A-2:
  41% N,N'-bis[α-methoxyethyl]-N,N'-ethyleneurea
  59% N-[α-methoxyethyl]-N,N'-ethyleneurea Fraction A-3:
  85% N-[α-methoxyethyl]-N,N'-ethyleneurea
  15% N-vinyl-N,N'-ethyleneurea Fraction B was redistilled to yield fraction B-1 (78.6 parts) boiling at 113° to 121° C. at 0.4 mm.; and fraction B-2 (12.6 parts) boiling at 124° C. at 0.38 mm. to 146° C. at 0.52 mm. Fraction B-2 was found by analysis to be N,N'-ethyleneurea and fraction B-1 to consist of 83% N-vinyl-N,N'-ethyleneurea and 17% N-[α-methoxyethyl]-N,N'-ethyleneurea. The N-vinyl ethyleneurea was separated by crystallization from ether and after a recrystallization 39 parts of N-vinyl-N,N'-ethyleneurea, M.P. 77° to 78° C., was obtained.

In another experiment, carried out in identical fashion but with only half as much acid catalyst, none of either of the methoxy derivatives was isolated and the yield of N-vinyl-N,N'-ethyleneurea, M.P. 77° to 78° C., was increased to 59 parts.

*Example 2*

N,N'-ethyleneurea (172 parts) was dissolved in 500 parts of isopropyl alcohol by warming to 50° C. The acidity of the solution was adjusted with methanolic hydrogen chloride to a spot-plate pH of 4.0 to 4.4, the solution was cooled to 30° to 40° C. and 88 parts of freshly distilled acetaldehyde was added over a period of thirty-five minutes while maintaining a temperature of 34° to 40° C. The mixture was allowed to stand at room temperature overnight. A solid by-product that had separated during this period was filtered off and the filtrate was adjusted to a spot-plate pH of 7.2 to 7.4 with methanolic sodium hydroxide. The alcohol was stripped in vacuo and the residue distilled through a modified Claisen apparatus to yield fraction A (25.5 parts) boiling at 106° to 131° C. at 0.9 mm.; fraction B (67 parts) boiling at 131° to 154° C. at 1.5 mm.; and fraction C (31 parts) boiling at 148° to 154° C. at 1.5 mm. N-vinyl-N,N'-ethyleneurea (57.3 parts) (M.P. 77° to 78° C.) was separated from fractions B and C by crystallization from ether solutions. The ether filtrates were combined with fraction A, the ether evaporated and the residue distilled to yield fraction A-1 (3.5 parts) boiling at 80° to 100° C. at 1.2 mm.; fraction A-2 (18.5 parts) boiling at 107° C. to 110° C. at 1.7 mm.; and fraction A-3 (16 parts) boiling at 119° to 126° C. at 1.7 mm.

Fraction A-2 is chiefly N,N'-bis[α-isopropoxyethyl]-N,N'-ethyleneurea.

Fraction A-3 is chiefly N-α-isopropoxyethyl-N,N'-ethyleneurea.

Addition of 0.5 part of sodium methoxide to fraction A-3 and distillation produces a distillate containing N-vinyl-N,N'-ethyleneurea.

*Example 3*

N,N'-ethyleneurea (172 parts) was dissolved in 400 parts of water. The pH was adjusted to 4.0 to 4.4 with hydrochloric acid and 123.3 parts of freshly distilled acetaldehyde was added over a period of one hour while holding the temperature at 25° to 30° C. The mixture was stirred for forty-five minutes at room temperature followed by adjustment of the pH to 7.3 to 7.5 with sodium hydroxide. The water was stripped off in vacuo and the residue was heated in vacuo to a maximum temperature of 239° C. During this period, the following fractions were distilled and collected. Fraction I (11.3 parts) boiling at 149° to 156° C. at 1.7 mm. Hg; fraction II (89.5 parts) boiling at 147° to 156° C. at 1.7 mm. Hg; and fraction III (76.8 parts) boiling at 146° to 147° C. at 1.2 mm. Hg. The three fractions were boiled with ether to extract the product from any N,N'-ethyleneurea present. N,N'-ethyleneurea (22 parts) was recovered by filtration. Chilling of the ether filtrates precipitated N-vinyl-N,N'-ethyleneurea (111 parts total), M.P. 71° to 73° C. Recrystallization of the latter from a methanol-ether mixture yielded 84 parts of N-vinyl-N,N'-ethyleneurea, M.P. 76° to 78° C.

The filtrate from the original N-vinyl-N,N'-ethyleneurea precipitation was combined with that from the recrystallization, the ether evaporated and the residue distilled to yield fraction IV (28 parts) boiling at 113° to 120° C. at 0.65 mm. Hg; fraction V (6.7 parts) boiling at 120° to 131° C. at 0.65 mm. Hg; and fraction VI (7.2 parts) boiling at 131° to 148° C. at 0.7 mm. Hg. Treatment of the fractions with ether as described above yielded an additional 25.7 parts of N-vinyl-N,N'-ethyleneurea (M.P. 77° to 78° C.) and 6.7 parts of N,N'-ethyleneurea.

*Example 4*

The procedure of Example 3 was repeated using 88 parts of acetaldehyde, instead of 123.3 parts, to yield 88.4 parts of N-vinyl-N,N'-ethyleneurea. N,N'-ethyleneurea (44.7 parts) was recovered.

*Example 5*

N,N'-ethyleneurea (86 parts) was dissolved in 200 parts of water. The pH was adjusted to 4.2 to 4.4 with hydrochloric acid and 81.3 parts of propionaldehyde was added over a period of forty-five minutes while maintaining the temperature at 25° to 30° C. The mixture was then stirred at room temperature for forty-five minutes, the pH was adjusted to 7.2 to 7.4 with sodium hydroxide and the water was stripped, in vacuo, leaving a clear viscous, resin-like mass. This resin was heated in vacuo to a maximum temperature of 225° C. During the heating period, distillation took place to give 97.6 parts of N-propenyl-N,N'-ethyleneurea boiling at 153° to 161° C. at 1.6 to 2.0 mm. Hg. The product crystallized on standing and recrystallization from methanol gave the pure compound melting at 123° to 124° C.

*Analysis.*—Calc'd for $C_6H_{10}ON_2$: C, 57.12%; H, 7.99%; N, 22.21%; M.W. 126. Found: C, 56.86%; H, 8.02%; N, 21.89%; M.W. 129.

*Example 6*

N,N'-ethyleneurea (172 parts) was dissolved in 200 parts of water and 96.8 parts of freshly-distilled acetaldehyde was added over a period of thirty-five minutes while holding the temperature at 27° to 30° C. The mixture was stirred at room temperature for an additional thirty minutes after which the pH of the mixture was found to be 6.5. Sodium hydroxide was added to raise the pH to 8.0 to 8.2 and the water was stripped off in vacuo. The residue was heated in vacuo to a maximum temperature of 275° C. During this period, distillate boiling at 156° to 166° C. at 0.4 to 0.8 mm. of mercury was collected. A mixture of the distillate (188 parts) and 630 parts of ethyl acetate was heated to boiling and then was chilled in an ice-bath. N,N'-ethyleneurea (25 parts) separated and was filtered off. The ethyl acetate was stripped from the filtrate in vacuo and the residue was distilled through a short Vigreux column to yield 109.5 parts of N-vinyl-N,N'-ethyleneurea boiling at 114° to 117° C. at 0.5 mm. of mercury and melting at 77° to 79° C.

*Example 7*

(a) A mixture of 86 parts of N,N'-ethyleneurea and 88 parts of freshly-distilled acetaldehyde was heated to reflux and maintained there until the ethyleneurea was completely dissolved. The mixture was then distilled in vacuo to yield 88.5 parts of distillate boiling at 147° to 163° C. at 1 mm. of mercury. A mixture of the distillate and 320 parts of ethyl acetate was heated to boiling and then was chilled in an ice-bath. N,N'-ethyleneurea (10 parts) separated and was filtered off. The ethyl acetate was stripped from the filtrate in vacuo and the residue was distilled through a short Vigreux column to yield 53.5 parts of N-vinyl-N,N'-ethyleneurea boiling at 111° to 120° C. at 0.3 mm. of mercury and melting at 72° to 76° C.

(b) The procedure of Example 7(a) was repeated substituting 126 parts of hexahydrophenylacetaldehyde for the acetaldehyde there used. The product (64 parts) was N-(β-cyclohexylvinyl)-N,N'-ethyleneurea.

(c) The procedure of Example 7(a) was repeated substituting 134 parts of hydrocinnamaldheyde, to which 0.3 part of glacial acetic acid had been added, for the acetaldehyde to yield 90 parts of N-(β-benzylvinyl)-N,N'-ethyleneurea.

(d) The procedure of Example 7(a) was repeated substituting 100 parts of N,N'-trimethyleneurea for the N,N'-ethyleneurea there used. The product (75 parts) was N-vinyl-N,N'-trimethyleneurea.

(e) A yield of 100 parts of N-(β-phenylvinyl)-N,N'-trimethyleneurea was obtained by substituting 100 parts of N,N'-trimethyleneurea for the N,N'-ethyleneurea and 120 parts of phenylacetaldehyde for the acetaldehyde in the procedure of Example 7(a).

(f) A yield of 78 parts of N-(β-octylvinyl)-N,N'-trimethyleneurea was obtained by substituting 100 parts of N,N'-trimethyleneurea for the N,N'-ethyleneurea and 156 parts of capric aldehyde for the acetaldehyde in the procedure of Example 7(a).

It is to be understood that changes and variations may be made without departing from the spirit and scope of the invention as defined in the appended claims.

I claim:

1. A method for producing an N-vinyl derivative of a cyclic N,N'-alkyleneurea which comprises reacting, in the presence of an acid, an aldheyde having the structure of Formula II:

II      RR'CHCHO and a cyclic urea having the structure of Formula III:

III
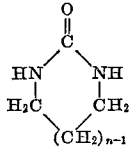

where R is selected from the group consisting of H, phenyl, benzyl, cyclohexyl and alkyl groups having 1 to 8 carbon atoms, and R' is selected from the group consisting of H and alkyl groups having 1 to 4 carbon atoms, and $n$ is an integer having a value of 1 to 2, subsequently heating the reaction mixture to distill a product having the structure of Formula I:

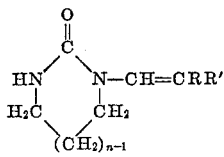

where R, R', and $n$ are as defined above.

2. A method for producing N-vinyl-N,N'-ethyleneurea which comprises reacting acetaldehyde and N,N'-ethyleneurea in the presence of a small amount of acid, subsequently heating the reaction mixture to a temperature between 185° and 285° C. and distilling N-vinyl-N,N'-ethyleneurea.

3. A method for producing an N-vinyl derivative of a cyclic N,N'-alkyleneurea which comprises reacting, in an aqueous acidic solution having a pH less than 7, an aldehyde of Formula II as defined in claim 1 with a cyclic urea of Formula III as defined in claim 1, and subsequently heating the reaction mixture to distill a product having the structure of Formula I as defined in claim 1.

4. A method for producing an N-vinyl derivative of a cyclic N,N'-alkyleneurea which comprises reacting, in an aqueous acidic solution having a pH less than 7, an aldehyde of Formula II as defined in claim 1 with a cyclic urea of Formula III as defined in claim 1, adding an alkaline material to adjust the pH to a value of about 7 to about 8, and subsequently heating the reaction mixture to distill a product having the structure of Formula I as defined in claim 1.

5. A method for producing an N-vinyl derivative of a cyclic N,N'-alkyleneurea which comprises reacting, in an aqueous acidic solution having a pH between 1 and 6.5, an aldehyde of Formula II as defined in claim 1 with a cyclic urea of Formula III as defined in claim 1, adding an alkaline material to adjust the pH to a value of about 7 to about 8, subsequently heating the reaction mixture to a temperature between 185° and 285° C., and then recovering a product of Formula I as defined in claim 1.

6. A method for producing N-vinyl-N,N'-ethyleneurea which comprises reacting, in an aqueous acidic medium having a pH between 1 and 6.5, acetaldehyde and N,N'-ethyleneurea, adding an alkaline material to adjust the pH to between about 7 and 8, subsequently heating the reaction mixture to a temperature between 185° and 285° C. and distilling N-vinyl-N,N'-ethyleneurea.

7. A method for producing an N-vinyl derivative of a cyclic N,N'-alkyleneurea which comprises reacting, in an acidic solution in a lower alcohol, an aldehyde of Formula II as defined in claim 1 and a cyclic urea of Formula III as defined in claim 1, adding an alkaline material to adjust the pH to a value of about 7 to about 8, subsequently heating the reaction mixture to distill a product having the structure of Formula I as defined in claim 1.

8. A method for producing an N-vinyl derivative of a cyclic N,N'-alkyleneurea which comprises reacting, in an acidic solution in a lower alcohol, an aldehyde of Formula II as defined in claim 1 and a cyclic urea of Formula III as defined in claim 1, adding an alkaline material to adjust the pH to a value of about 7 to about 8, distilling from the alkaline mixture a fraction containing an N-α-alkoxyalkyl-N,N'-alkyleneurea, adding a small amount of an alkali metal alkoxide to said fraction, and distilling the resulting mixture to produce a distillate containing a compound of Formula I as defined in claim 1.

9. A method for producing N-vinyl-N,N'-ethyleneurea which comprises reacting, in an acidic methanol solution having a pH between 1 and 6.5, acetaldehyde and N,N'-ethyleneurea, adding an alkaline material to adjust the pH to between about 7 and 8, subsequently heating the reaction mixture to a temperature between 185° and 285° C. and distilling N-vinyl-N,N'-ethyleneurea.

10. A method for producing N-propenyl-N,N'-ethyleneurea which comprises reacting, in an aqueous acidic medium having a pH between 1 and 5, propionaldehyde and N,N'-ethyleneurea, adding an alkaline material to adjust the pH to between about 7 and 8, subsequently heating the reaction mixture to a temperature between 185° and 285° C., and distilling N-propenyl-N,N'-ethyleneurea.

11. A method which comprises reacting hexahydrophenyl acetaldehyde and N,N'-ethyleneurea at a temperature betwen 15° and 220° C., in the presence of acid, and subsequently distilling N-(β-cyclohexylvinyl)-N,N'-ethyleneurea.

12. A method which comprises reacting hydrocinnamaldehyde and N,N'-ethyleneurea at a temperature between 15° and 222° C., in the presence of acid, and subsequently distilling N-(β-benzylvinyl)-N,N'-ethyleneurea.

13. A method which comprises reacting acetaldehyde and N,N'-trimethyleneurea at a temperature betwen 15° and 220° C., in the presence of acid, and subsequently distilling N-vinyl-N,N'-trimethyleneurea.

14. A method which comprises reacting phenylacetaldehyde and N,N'-trimethyleneurea at a temperature between 15° and 220° C., in the presence of acid, and subsequently distilling N-(β-phenylvinyl)-N,N'-trimethyleneurea.

15. A method which comprises reacting capric aldehyde and N,N'-trimethyleneurea at a temperature between 15° and 220° C., in the presence of acid, and subsequently distilling N-(β-octylvinyl)-N,N'-trimethyleneurea.

No references cited.